United States Patent [19]

Harada et al.

[11] Patent Number: 4,880,434
[45] Date of Patent: Nov. 14, 1989

[54] METHOD OF OBTAINING DYED AND FINISHED CELLULOSE FIBER MATERIALS USING REACTIVE METALLIZED FORMAZAN DYE WITH NO COLOR CHANGE

[75] Inventors: Naoki Harada, Suita; Tetsuya Miyamoto, Takatsuki; Kunihiko Imada, Sakai; Takashi Omura, Kobe, all of Japan

[73] Assignee: Sumitomo Chemical Company, Limited, Osaka, Japan

[21] Appl. No.: 217,631

[22] Filed: Jul. 12, 1988

[30] Foreign Application Priority Data

Jul. 23, 1987 [JP] Japan .................. 62-185283
Jul. 30, 1987 [JP] Japan .................. 62-191943

[51] Int. Cl.⁴ .......................... D06P 3/66; D06P 5/06; D06P 1/38
[52] U.S. Cl. ............................. 8/549; 8/543; 8/556; 8/606; 8/608; 8/686; 8/918; 534/618; 534/619; 534/629
[58] Field of Search ............ 8/549, 686; 534/618, 534/629

[56] References Cited

U.S. PATENT DOCUMENTS 4,754,023 6/1988 Tzikas et al. .................. 534/618

FOREIGN PATENT DOCUMENTS 99721 2/1984 European Pat. Off. .
2172896 10/1986 United Kingdom .

Primary Examiner—A. Lionel Clingman
Attorney, Agent, or Firm—Stevens, Davis, Miller & Mosher

[57] ABSTRACT

Dyed and finished products of cellulose fiber materials superior in fastness properties are obtained without change in color shade by finishing dyed products with a fixing agent or/and a finishing agent capable of bonding with cellulose through a bridge formation, the dyed products being obtained by dyeing cellulose fiber materials with a dye represented by the following formula in the free acid form,

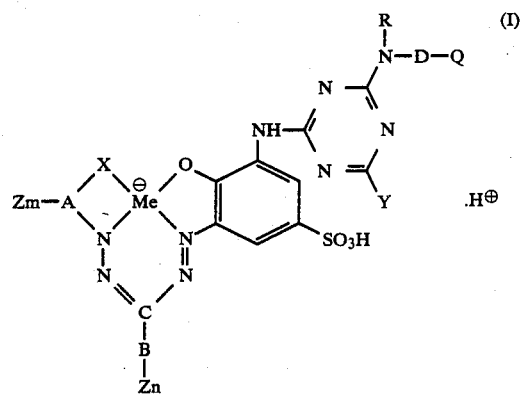

wherein A is phenylene or naphthylene, B is alkyl, alkenyl, phenyl, naphthyl or heterocyclic group, Me is metal ion, X is —O— or

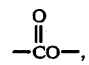

Y is alkoxy, phenoxy or amino, Z is sulfo or the like water-solubility-imparting group, m and n are each 0 or an integer of 1 to 3, provided that the sum is 1 to 3, D is phenylene or naphthylene, Q is —SO₂CH=CH₂ or —SO₂CH₂CH₂L in which L is splittable group by the action of an alkali and R is hydrogen or alkyl.

8 Claims, No Drawings

METHOD OF OBTAINING DYED AND FINISHED CELLULOSE FIBER MATERIALS USING REACTIVE METALLIZED FORMAZAN DYE WITH NO COLOR CHANGE

The present invention relates to a method of obtaining dyed and finished products of cellulose fiber materials. More specifically, the present invention relates to a method for producing dyed and finished products of cellulose fiber materials superior in fastness properties by dyeing cellulose fiber materials, followed by finishing with a fixing agent and/or a finishing agent capable of bonding with the cellulose fiber materials through a bridge formation.

Dyed products of cellulose fiber materials have been produced by dyeing the fiber materials using various dyes such as direct dyes, sulfur dyes, vat dyes, naphthol dyes, reactive dyes and the like. Recently, however, reactive dyes have been extensively used, because the direct dyes, sulfur dyes and naphthol dyes have problems in fastness, so that they should be used only in a limited field, the sulfur dyes, vat dyes and naphthol dyes require troublesome procedures for the dyeing, and moreover the vat dyes are expensive for the dyeing, notwithstanding they can give favorable fastness properties.

With respect to the reactive dyes, for example, formazan compounds are disclosed as reactive blue dyes in Published Unexamined Japanese Patent Application No. 59-15451. These reactive dyes have been put into practical use as economical and useful dyes because they can give good color yield even by any known industrial dyeing method and fastness properties competent to usual requirements. However, these reactive dyes all alike have drawbacks such that the dyed products markedly change their color shade when finished with a fixing agent in order to improve their fastness properties such as wet fastness, chlorine fastness and others.

As the reactive dyes usable for dyeing the fiber materials in a blue to black color, there are known C.I. Reactive Black 5, C.I. Reactive Blue 184 and the like, which are fiber-reactive disazo dyes having 1-amino-8-naphthol-3,6-disulfonic acid as a divalent coupling component as disclosed in German Pat. No. 2417253 and German Patent Publication No. 1644198. These reactive dyes have now been extensively used because of their economical advantages resulting from the fact that they can exhibit favorable dyeability even by a conventional dyeing method applied industrially and give dyed products having fastness properties meeting needs usually required. However, these dyes all alike have drawbacks such that when products dyed with such reactive dyes are finished with a cellulose-reactive finishing agent such as N-methylol compounds, the color shade markedly changes and fastness properties such as light fastness markedly deteriorates, as compared with those before the finishing.

These finishings of the products dyed with the reactive dyes using the fixing agent and/or the cellulose-reactive finishing agents are significant from industrial point of view. That is, the finishing with the fixing agent is practically useful for the products dyed with the reactive dyes to improve their fastness properties such as wet fastness, chlorine fastness and others and to save labor of a rinsing work in the dyeing-finishing process, and therefore it becomes very important to make the color shade unchanged even after such finishing. The finishing with such cellulose-reactive finishing agent is practically useful for improving the properties of cellulose fibers, such as shrink resistance, crease resistance, wash and wear property, durable press property and the like, and therefore it becomes very important to make the color shade and fastness unchanged even after such finishing.

For such purposes, vat dyes have heretofore been used, but now increasingly required to be replaced by the reactive dyes because of the reasons described above. Moreover, the finishing with the fixing agent and the finishing with the cellulose-reactive finishing agent have increased to be applied even for the products dyed with the reactive dyes in order for meeting needs of consumers requiring further improved fastness properties and further labor-saving. Thus, it is anxious to find a method for obtaining dyed fiber materials unsusceptible to such finishings.

The present inventors have undertaken extensive studies to find a method for obtaining products of cellulose fiber materials, which are dyed with a reactive dye and finished, hard to change the color shade and excellent in fastness properties, and as a result found that the object can be accomplished by dyeing cellulose fiber materials with a specific fiber reactive formazan dye, followed by such finishing.

The present invention provides a method for producing dyed and finished products of cellulose fiber materials, which comprises dyeing cellulose fiber materials with a dye represented by the following formula (I) in a free acid form,

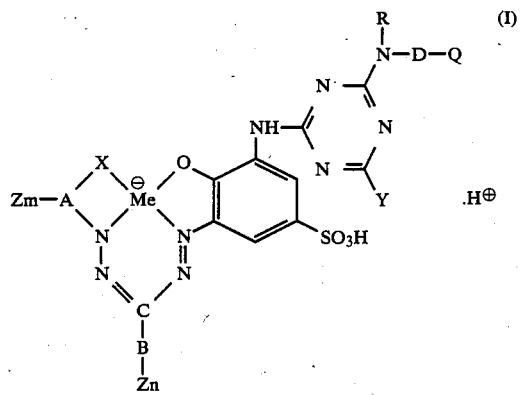

wherein A is a substituted or unsubstituted phenylene or naphthylene group, B is a straight or branched alkyl or alkenyl group or a phenyl, naphthyl or heterocyclic group, the alkyl, alkenyl, phenyl, naphthyl and heterocylic groups being substituted or unsubstituted, Me is an ion of a metal having an atomic number of from 27 to 29, X is —O— or

Y is a substituted or unsubstituted lower alkoxy or phenoxy group, or —$NR_1R_2$ in which $R_1$ and $R_2$ independently of one another are each a hydrogen atom or a substituted or unsubstituted lower alkyl, phenyl, naphthyl or benzyl group, Z is a water-solubility-imparting group, m and n are each 0 or an integer of 1 to 3, provided that the sum of m and n is 1 to 3, D is a substituted or unsubstituted phenylene or naphthylene group, Q is —$SO_2CH=CH_2$ or —$SO_2CH_2CH_2L$ in which L is a group splittable by the action of an alkali, and R is a hydrogen atom or a substituted or unsubstituted lower alkyl group, and then finishing the dyed fiber materials with a fixing agent or/and a finishing agent capable of bonding with cellulose through a bridge formation.

In the above formula (I), the phenylene or naphthylene group represented by A may be unsubstituted or substituted by, for example, halogen, nitro, $C_1 \sim C_4$ alkyl, $C_1 \sim C_4$ alkoxy, sulfamoyl, N-mono- or N,N-di-$C_1 \sim C_4$ alkylsulfamoyl, $C_1 \sim C_4$ alkylsulfonyl, phenylsulfonyl or the like. Of these, preferred is a phenylene group unsubstituted or substituted once or twice, preferably once by chlorine, bromine, nitro, methyl, ethyl, methoxy, ethoxy, sulfamoyl or N,N-dimethylsulfamoyl.

The straight or branched alkyl or alkenyl group represented by B is preferably one having upto 8 carbon atoms which may be unsubstituted or substituted by phenyl unsubstituted or substituted by methyl, ethyl, methoxy, ethoxy, halogen or sulfamoyl.

The phenyl or naphthyl group represented by B may be unsubstituted or substituted by, for example, hydroxy, nitro, halogen, $C_1 \sim C_4$ alkyl, $C_1 \sim C_4$ alkoxy, carbo-$C_1 \sim C_4$ alkoxy or the like.

The heterocyclic group represented by B includes, for example, furan, thiophene, pyrrole, imidazol, indol, pyrazol, pyridine, pyrimidine, quinoline, benzimidazol and the like. To the aromatic carbon atom constituting the heterocyclic group, halogen, phenyl, methyl, ethyl, methoxy, ethoxy and the like may be substituted. The hydrogen atom of —NH— in the heterocyclic group may be replaced by methyl, ethyl or benzyl.

Of these groups represented by B, preferred is a phenyl group unsubstituted or substituted once or twice by chlorine, methyl, ethyl, methoxy, ethoxy, carbomethoxy, carboethoxy or nitro.

Among the metal ions having an atomic number of from 27 to 29, preferred is a copper ion.

The substituted or unsubstituted lower alkoxy group represented by Y includes ones having one or two oxygen atom and two to four carbon atoms, for example, iso-propoxy, β-methoxyethoxy and the like. A preferred lower alkoxy group is methoxy.

The phenoxy group represented by Y may be unsubstituted or substituted once or twice by sulfo, methyl, nitro or halogen. Of these, preferred is an unsubstituted phenoxy group.

The lower alkyl group represented by $R_1$ and $R_2$ in —$NR_1R_2$ as Y is preferably one having 1 to 4 carbon atoms which may be substituted once or twice by alkoxy having 1 to 4 carbon atoms, sulfo, carboxy, hydroxy, chlorine, phenyl or sulfato, the phenyl group represented by $R_1$ and $R_2$ may be unsubstituted or substituted once or twice by alkyl having 1 to 4 carbon atoms, alkoxy having 1 to 4 carbon atoms, sulfo, carboxy or chlorine, the naphthyl group represented by $R_1$ and $R_2$ may be unsubstituted or substituted once, twice or three times by hydroxy, carboxy, sulfo, alkyl having 1 to 4 carbon atoms, alkoxy having 1 to 4 carbon atoms or chlorine, and the benzyl group represented by $R_1$ and $R_2$ may be unsubstituted or substituted once or twice by alkyl having 1 to 4 carbon atoms, alkoxy having 1 to 4 carbon atoms, sulfo or chlorine. Of these, a preferable Y is represented by —$NR_3R_4$ in which $R_3$ is a hydrogen atom, a methyl group or a lower alkyl group unsubstituted or substituted by hydroxy, sulfo or carboxy, $R_4$ is a hydrogen atom, a methyl group, a lower alkyl group unsubstituted or substituted by hydroxy, sulfo or carboxy, or a phenyl or naphthyl group unsubstituted or substituted by carboxy or sulfo.

The water-solubility-imparting group represented by Z includes, for example, sulfonic acid group, carboxylic acid group, phosphoric acid group and the like, which can be appended to the phenylene, naphthylene, alkyl, alkenyl, phenyl, naphthyl or heterocyclic group represented by A and B, or the aromatic or aliphatic carbon atom of the substituents appended to the above group.

The phenyl or naphthyl group represented by D may be unsubstituted or substituted by, for example, $C_1 \sim C_4$ alkyl, preferably such as methyl and ethyl, $C_1 \sim C_4$ alkoxy, preferably such as methoxy and ethoxy, halogen, preferably such as chlorine and bromine, nitro, sulfo, carboxy and the like.

The lower alkyl group represented by R includes, for example, methyl, ethyl, propyl, butyl and the like, which may be unsubstituted or substituted by hydroxy, carboxy, sulfo, carbamoyl, cyano, methoxycarbonyl or the like. Of these, groups represented by R, preferred are methyl, ethyl, carbamoylethyl, hydroxyethyl, and n- or iso-propyl.

Preferred X is carbonyloxy

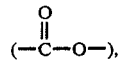

and the sum of m and n is preferably 1 or 2.

The group splittable by the action of an alkali represented by L in —$SO_2CH_2CH_2L$ as Q includes, for example, halogen such as chlorine and bromine, ester groups of organic carboxylic or sulfonic acid such as lower alkanoyloxy including acetyloxy, benzoyloxy, benzenesulfonyloxy and the like, and groups represented by the following formula in the free acid form, —$OPO_3H_2$, —$SSO_3H$, —$OSO_3H$ and the like. Of these, most preferred is —$OSO_3H$. Thus, preferred Q is —$SO_2CH_2CH_2OSO_3H$ which may be replaced partially by —$SO_2CH=CH_2$.

Among the dyes represented by the formula (I), preferred are those having sulfo as Z, copper ion as Me, unsubstituted or substituted phenyl as B,

as X and unsubstituted or substituted phenylene as A. Specifically preferred is a dye represented by the following formula (II) in the free acid form,

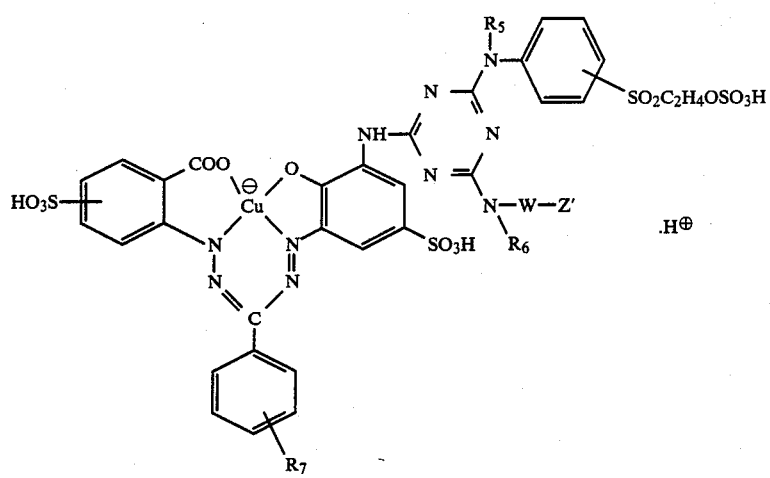
(II)

wherein $R_5$ and $R_6$ independently of one another are each hydrogen, methyl or ethyl, $R_7$ is hydrogen, methyl, ethyl, nitro, sulfo or chlorine, W is a lower alkylene or phenylene group, and Z′ is hydrogen, sulfo or carboxy. More specifically, it is represented by the following formula (II′) in the free acid form,

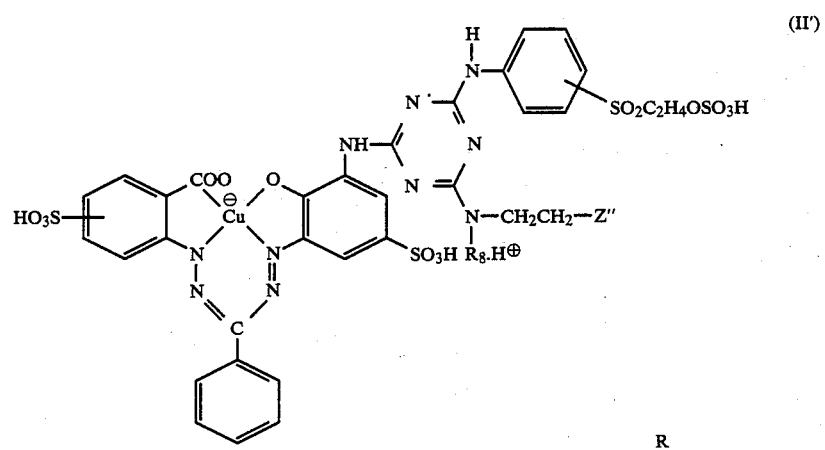
(II′)

wherein $R_8$ is hydrogen, methyl or ethyl, and Z″ is sulfo or carboxy.

These dyes may be preferably in the form of alkali metal or alkaline earth metal salts, particularly those such as sodium and potassium salts.

The dye represented by the formula (I) can be produced readily by condensing a formazan compound represented by the following formula (III) in the free acid form,

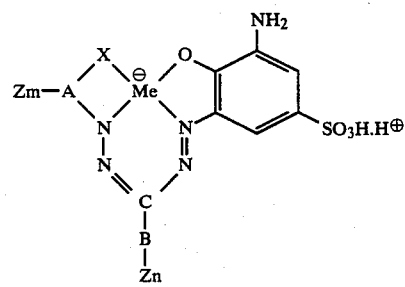
(III)

wherein A, B, Me, X, Z, m and n are as defined above, an aromatic amine compound represented by the following formula (IV)

(IV)

wherein R, D and Q are as defined above, and a compound represented by the following formula (V),

H—Y        (V)

wherein Y is as defined above, with 1,3,5-trihalogeno-s-triazine in an optional order.

The order of the condensation, and the reaction conditions are not particularly limited. Generally speaking, the condensation reactions can be carried out at a temperature of about −5° to about 100° C. within a pH range of 2 to 8, preferably 3 to 6.

Considering the reaction yield and the quality of the desired dye (I), the first condensation reaction may be preferably carried out using any one of the aforesaid starting compounds (III), (IV) and (V) which is lowest in the reactivity with the 1,3,5-trihalogeno-s-triazine, followed by second and third condensation reactions using the remaining two. In this case, the first condensation reaction can be carried out under conditions predetermined depending on the stability of the starting compound and the resulting compound therefrom, for example, relatively low pH and temperature ranges such as pH of 3 to 4 and temperature of −5° to 10° C.

The second and the third condensation reactions can be also carried out under conditions pre-determined depending on the stability of the starting compounds, intermediate compounds and the final product. For example, the second condensation can be carried out at a temperature of 30° to 40° C. within a pH of 4 to 6, and the third condensation at a temperature of 50° to 80° C. within a pH of 4 to 6.

The formazan compound of the above formula (III) to be used as the starting compound can be prepared by diazotizing an aromatic amine compound represented by the following formula (VI),

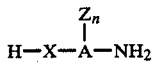 (VI)

wherein A, X, Z and n are as defined above, reacting the resulting diazonium salt with a sulfite to produce the corresponding N-sulfonic acid, hydrolyzing the N-sulfonic acid with a mineral acid, reacting the hydrolysate with an aldehyde compound represented by the following formula (VII),

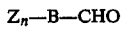 (VII)

wherein B, Z and n are as defined above, coupling the resulting hydrozone compound with a diazonium salt of 3-amino-4-hydroxy-5-acylaminobenzenesulfonic acid, during which or thereafter a metal donor such as sulfuric acid salt, carboxylic acid salt, acetic acid salt, salicyclic acid salt or tartaric acid salt of the desired metal, is added to form the corresponding metal complex, and at the same time or successively subjecting the resultant to hydrolysis of the acylamino group using an acid or an alkali.

Examples of the aromatic amine compound represented by the formula (VI) usable for the preparation of the starting formazan compound represented by the formula (III) are 2-aminophenol, 4- or 5-methyl-2-aminophenol, 4- or 5- sulfo-2-aminophenol, 4-sulfo-6-carboxy-2-aminophenol, 4-methoxy-2-aminophenol, 5-methylsulfonyl-2-aminophenol, 4-dimethylaminosulfamoyl-2-aminophenol, 5-nitro-2-aminophenol, 4-bromo-2-aminophenol, 1-amino-2-hydroxynaphthalene-4,6-disulfonic acid, 1-amino-2-hydroxy-6-nitronaphthalene-4-sulfonic acid, 1-amino-2-hydroxy-6-chloronaphthalene-4-sulfonic acid, 2-aminobenzoic acid, 4- or 5- sulfo-2-aminobenzoic acid, 5-nitro-2-amino-benzoic acid, 5-chloro-2-aminobenzoic acid and 5-methoxy-2-aminobenzoic acid.

Examples of the aldehyde compound represented by the formula (VII) are benzaldehyde, 2-, 3- or 4-methylbenzaldehyde, 4-methylbenzaldehyde-3-sulfonic acid, 2-, 3- or 4-methoxybenzaldehyde, 4-methoxy-3-chlorobenzaldehyde, 3-nitrobenzaldehyde, 2-hydroxybenzaldehyde, 2-, 3- or 4-chlorobenzaldehyde, 2,4-dichlorobenzaldehyde, 2-chlorobenzaldehyde-5-sulfonic acid, benzaldehyde-2-sulfonic acid, benzaldehyde-3-sulfonic acid, benzaldehyde-4-sulfonic acid, benzaldehyde-2,4-disulfonic acid, 1-naphthaldehyde, 2-naphthaldehyde, furan-2-aldehyde, thiophene-2-aldehyde, pyrrole-2-aldehyde, imidazol-2-aldehyde, pyrazol-5-aldehyde, pyridine-2-aldehyde, pyridine-3-aldehyde, pyridine-4-aldehyde, pyrimidine-5-aldehyde, quinoline-4-aldehyde, benzimidazol-2-aldehyde, acetaldehyde, propionaldehyde, n-butylaldehyde, enanthylaldehyde, acrylaldehyde, crotonaldehyde, phenacetaldehyde and cinnamaldehyde.

The secondary amine compound having the lower alkyl group as R in the above formula (IV) standing for the aromatic amine compound can be prepared by reacting an aromatic primary amine compound represented by the following formula (VIII),

 (VIII)

wherein D and Q are as defined above, with an alkylating agent described below, or reacting a precursor of the compound (VIII) represented by the following formula (IX),

 (IX)

wherein D is as defined above, with the alkylating agent, followed by esterification or halogenation in a conventional manner.

The alkylating agent includes, for example, alkyl halides, dialkylsulfuric acids, α-substituted-ethylenes and oxides, from which a suitable one can be selected depending on the kind of R in the above formula (IV).

Examples of the alkylating agent are alkyl halides such as methyl, ethyl, n- or iso-propyl, or n-, iso- or sec-butyl bromide and iodide, α-substituted ethylenes such as acrylonitrile, acrylic acid, methyl or ethyl acrylate, acrylamide and vinylsulfonic acid, dialkylsulfuric acids such as dimethylsulfuric acid and diethysulfuric acid, and oxides such as ethylene oxide, propylene oxide, glycidol, trimethylene oxide, β-butylene oxide, 2-methyl-α-butylene oxide, 2-ethyl-3-methylethylene oxide, methoxyethylene oxide and n-butoxyethylene oxide.

Examples of both the aromatic primary amine compound represented by the above formula (VIII) usable as the starting compound for the preparation of the above secondary amine compounds, and the aromatic primary amine compound having hydrogen as R in the above formula (IV), are 1-aminobenzene-2-, 3- or 4-β-sulfatoethylsulfone, 1-aminobenzene-3-β-phosphatoethylsulfone, 1-amino-4-methylbenzene-3-β-sulfatoethylsulfone, 1-aminobenzene-3-β-chloroethylsulfone, 1-amino-4-methoxybenzene-3-β-sulfatoethylsulfone, 1-amino-2,5-dimethoxybenzene-4-β-sulfatoethylsulfone, 1-amino-2-methoxybenzene-4-β-sulfatoethylsulfone, 1-amino-2-chlorobenzene-4-β-sulfatoethylsulfone, 1-amino-2-methoxybenzene-5-β-sulfatoethylsulfone, 2-aminonaphthalene-8-β-sulfatoethylsulfone, 2-aminonaphthalene-8-β-sulfatoethylsulfone-6-sulfonic acid, 1-amino-2,5-dimethoxybenzene-4-vinylsulfone, 1-amino-2-methoxy-5-methylbenzene-4-β-sulfatoethylsulfone, 2-aminonaphthalene-4, 5, 6-or 7-β-sulfatoethylsulfone, 1-amino-2-bromobenzene-4-β-sulfatoethylsulfone, 1-amino-2-bromobenzene-4-vinylsulfone, 2-amino-8-sulfonaphthalene-6-β-sulfatoethylsulfone, 2-aminonaphthalene-8-β-phosphatoethylsulfone-6-sulfonic acid, 2-aminonaphthalene-8-vinylsulfone-6-sulfonic acid, 1-amino-2-methoxy-5-methylbenzene-4-β-chloroethylsulfone, 1-aminobenzene-2, 3- or 4-vinylsulfone, 1-amino-2-nitrobenzene-4-β-sulfatoethylsulfone, 1-amino-2-sulfo-4- or 5-β-sulfatoethylsulfone, 1-amino-2-methoxy-5-chlorobenzene-4-β-sulfatoethylsulfone and -4-vinylsulfone, 1-amino-2-ethoxy-5-chlorobenzene-4-β-sulfatoethylsulfone and -4-vinylsulfone, 2- aminonaphthalene-6-β-sulfatoethylsulfone-1-sulfonic acid, 5-chloroaniline-2-β-sulfatoethylsulfone, 5-sulfoaniline-2-β-sulfatoethylsulfone, aniline-2-β-thiosulfatoethylsulfone, 5-chloroaniline-2-β-thiosulfatoethylsulfone, 5-sulfoaniline-2-β-thiosulfatoethylsulfone, aniline-2-β-phosphatoethylsulfone, 5-chloroaniline-2-β-phosphatoethylsulfone, 5-sulfoaniline-2-β-phosphatoethylsulfone, aniline-2-vinylsulfone, 5-chloroaniline-2-vinylsulfone, 5-sulfoaniline-2-vinylsulfone, aniline-2-β-chloroethylsulfone, 5-chloroaniline-2-β-chloroethylsulfone and 5-sulfoaniline-2-β-chloroethylsulfone.

Examples of the compound represented by the above formula (V) are aromatic amines such as aniline, o-, m- or p-toluidine, 1-amino-3,4- or 3,5-dimethylbenzene, 1-amino-2, 3- or 4-ethylbenzene, 1-amino-2-, 3- or 4-methoxybenzene, 1-amino-4-ethoxybenzene, 1-amino-2-, 3- or 4-chlorobenzene, 2-, 3- or 4-aminophenylmethanesulfonic acid, 2-, 3- or 4-aminobenzenesulfonic acid, 3- or 4-methylaminobenzenesulfonic acid, 3- or 4-ethylaminobenzenesulfonic acid, 5-aminobenzene-1,3-disulfonic acid, 2-aminobenzene-1,4-disulfonic acid, 4-aminobenzene-1,3-disulfonic acid, 2-, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-methylaminobenzene, N-ethylaminobenzene, 1-methylamino-3- or 4-methylbenzene, 1-methylamino-4-chlorobenzene, 1-ethylamino-4-chlorobenzene, 1-ethylamino-3-or 4-methylbenzene, 1-(2-hydroxyethyl)amino-3-methylbenzene, 2-, 3- or 4-methylaminobenzoic acid, 2-, 3- or 4-methylaminobenzenesulfonic acid, 2-, 4-, 5-, 6-, 7- or 8-aminonaphthalene-1-sulfonic acid, 7-methyl, ethyl, propyl, butyl or isobutylaminonaphthalene-2-sulfonic acid, 1-, 4-, 5-, 6-, 7- or 8-aminonaphthalene-2-sulfonic acid, 4-, 5-, 6-, 7- or 8-aminonaphthalene-1,3-disulfonic acid, 2-, 3- or 4-aminonaphthalene-1,5-disulfonic acid, 4- or 8-aminonaphthalene-1,6-disulfonic acid, 4-aminonaphthalene-1,7-disulfonic acid, 3- or 4-aminonaphthalene-2,6-disulfonic acid, 3- or 4-aminonaphthalene-2,7-disulfonic acid, 6- or 7-aminonaphthalene-1,3,5-trisulfonic acid, 4-, 7- or 8-aminonaphthalene-1,3,6-trisulfonic acid and 4-aminonaphthalene-1,3,7-trisulfonic acid, ammonia, aliphatic amines such as methylamine, ethylamine, n-propylamine, isopropylamine, n-butylamine isobutylamine, sec.-butylamine, dimethylamine, diethylamine, methylethylamine, allylamine, 2-chloroethylamine, 2-methoxyethylamine, 2-aminoethanol, 2-methylaminoethanol, bis-(2-hydroxyethyl)-amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, ε-aminocapronic acid, benzylamine, 2-, 3- or 4-chlorobenzylamine, 4-methylbenzylamine, N-methylbenzylamine, 2-, 3-or 4-sulfobenzylamine, 2-phenylethylamine, 1-phenylethylamine, 1-phenyl-2-propylamine, glycine and β-alanine, lower alcohols such as methanol, ethanol, n-propanol, isopropanol, n-butanol and isobutanol, and substituted phenols such as 3- or 4-sulfophenol, 2,4-or 3,5-disulfophenol, 2-nitro-4-sulfophenol and 2-chloro-4-sulfophenol.

The above starting compounds may be used in the form of a free acid and/or a salt such as alkali metal and alkaline earth metal salts depending on the reaction conditions.

The kinds of pair ions in the starting compounds, alkali agents usable for the neutralization of acids in the course of the production process and electrolytes usable, if desired, for salting-out of the dye can be suitably selected in order to obtain a desired pair ion of the dye in the present invention.

The dye in accordance with the present invention can be used in the form of a liquid product or a pulverulent product. The reaction mixture as such obtained in the course of the production process can be used as the liquid product, if desired, after removing by-produced inorganic salts with or without a stabilizing agent or a dyeing improver. The reaction mixture or the liquid product can be evaporized by means of spray-drying or the like to obtain the pulverulent product. Alternatively, the reaction mixture can be subjected to salting-out with an electrolyte in a usual manner, followed by the formulation of the liquid or pulverulent product.

The fixing agents usable for the finishing of dyed products are those which can bond with the hydrophilic group such as sulfonic acid group present in the dye of the formula (I) to alter the dye into a water-insoluble compound, and include, for example, polyamine compounds as disclosed in Published Examined Japanese Patent Application Nos. 52-48221, 55-31234 and 60-7079, dicyandiamide compounds as disclosed in Published Examined Japanese Patent Application No. 36-1736 and Published Unexamined Japanese Patent Application Nos. 48-39781 and 57-47980, quaternary ammonium salts as disclosed in Published Unexamined Japanese Patent Application Nos. 58-136889 and 59-125986, and the like. These fixing agents not particularly limited thereto can be used each alone or in a mixture of two or more.

The finishing agent usable in the present invention and capable of bonding with cellulose fibers through a bridge formation includes those capable of being impregnated into the fibers to react with them through a bridge formation, thereby improving the physical properties of the fibers.

Examples of the finishing agents are N-methylol compounds, aldehyde compounds of the following formula, R—CHO, in which R is a hydrogen atom or an alkyl, cycloalkyl or haloalkyl group, acetal compounds of the following formula, R'—CH(OR")$_2$, in which R' is a hydrogen atom or an alkyl, cycloalkyl or haloalkyl group, and R" is a hydrogen atom or an alkyl group, epoxy compounds, active vinyl compounds, aziridinyl compounds, polycarboxylic acid compounds, acylhalide compounds, isocyanate compounds, quaternary ammonium compounds and the like. These may be used each alone or in a mixture of two or more. More specifically, the N-methylol compounds includes condensation type compounds such as dimethylolurea and methylated trimethylolmelamine, and cellulose-reactive type compounds such as dimethylol ethyleneurea, dimethylol alkylenetriazones, methylated methyloluran, hexamethylolmelamine, dimethylol propyleneurea, dimethylol hydroxyethyleneurea, tetramethylol acetylenediurea, dimethylolated 4-methoxy-5-dimethylpropyleneurea, dimethylol alkylcarbamates and derivatives thereof.

A catalyst usable in the present invention for the bridge formation reaction between the finishing agent and cellulose includes acids, acid salts and latent acid catalysts capable of liberating acids under heating conditions. Examples thereof are ammonium salts, alkanolamine salts, inorganic metal salts, which are commercially available as the catalysts for resin-finishing. Cellulose fiber materials usable in the present invention include natural and regenerated cellulose fiber materials such as cotton, hemp, viscose rayon, artificial rayon and the like.

In the present invention, the dyeing of cellulose fiber materials with the dye of the formula (I) can be carried out by any conventional dyeing method such as an exhaustion dyeing, cold batch dyeing or continuous dyeing method or a printing method.

The exhaustion dyeing can be carried out in a conventional manner using a dye bath containing an acid binding agent such as sodium carbonate, trisodium phosphate, sodium hydroxide and the like, and an inorganic salt such as sodium sulfate, sodium chloride and the like.

The cold batch dyeing can be carried out in a manner such that the fibers are padded at ambient temperatures with a liquor containing at least one acid binding agent such as sodium hydroxide, sodium silicate, sodium carbonate, sodium phosphate, sodium aluminate and the like, and if desired, an inorganic salt such as sodium sulfate, sodium chloride and the like along with or without a dissolving agent such as urea, a penetrant and the like, and then allowing the fibers padded to stand for a fixed period of time.

The continuous dyeing can be carried out in a conventional manner such as a pad-steam method wherein the fibers are padded with a dye liquor and then with a liquor of an acid binding agent such as sodium hydroxide, sodium silicate, sodium carbonate, sodium phosphate and the like, followed by a heat treatment with steam, an alkali shock method wherein the fibers padded with the dye liquor are treated with a hot liquor of the acid binding agent, and a baking method wherein the fibers are padded with a liquor containing both the dye and the acid binding agent such as sodium bicarbonate, sodium carbonate and the like, followed by a dry-heating.

The printing can be carried out by applying to the fibers a printing paste containing a sizing agent or emulsified sizing agent such as sodium alginate, starch ether and the like, an acid binding agent such as sodium carbonate, sodium bicarbonate, sodium hydroxide, trisodium phosphate, sodium trichloroacetate and the like, and if desired a printing auxiliary agent such as urea, sufactant and the like, and then heating the fibers in the presence or absence of steam.

The finishing of the dyed fiber materials using the fixing agent and/or the finishing agent capable of bonding with cellulose through a bridge formation can be carried out in a conventional manner.

For example, the finishing with the fixing agent can be carried out by a method comprising impregnating the dyed fibers into a solution containing the fixing agent, followed by washing with water and then drying, or a method comprising impregnating the dyed fibers into a solution containing the fixing agent, followed by press-squeezing and drying, or the like.

The conditions under which the former method can be carried out are not particularly limited. Usually however, using a solution containing the fixing agent in a concentration of 0.5 to 10 g/l, preferably 1 to 5 g/l, the finishing can be performed under a bath ratio of 4 or more at a temperature of 5° to 100° C., preferably 25° to 80° C. for 5 minutes or more, preferably 10 minutes or more.

The conditions under which the latter method can be carried out are also not particularly limited. Usually, however, the finishing can be performed in a manner such that the fibers are impregnated in a solution containing the fixing agent in a concentration of 1 to 100 g/l, preferably 5 to 50 g/l, press-squeezed up to 30 to 200%, preferably 40 to 120% in pick-up and then dried.

The latter method can be carried out also using conventional resin-finishing agents usually applied to the cellulose fiber materials.

In performing the finishing with the finishing agent capable of bonding with cellulose through a bridge formation, for example, the dyed fibers are impregnated with a solution containing both the finishing agent and the catalyst, press-squeezed up to 40 to 120% in pick-up, dried and then heat-treated, thereby completing the bridge formation reaction to obtain resin-finishing effects. The finished fibers may be or may not be rinsed, and then dried to obtain a final product.

The finishing in accordance with the present invention may be accompanied with other finishings such as softening, water and oil repellenting, soil releasing, sanitary finishing, flame retarding and the like, which have been usually applied for improving the properties of cellulose fiber materials.

The method of the present invention can solve the problems such that the dyed cellulose fiber materials are easy to change their color shade when finished with the fixing agent, and those dyed with C.I. Reactive Blue 184, C.I. Reactive Black 5 and other conventional disazo reactive dyes are easy to change their color shade and deteriorate fastness properties such as light fastness, hot pressing fastness, steam set fastness and the like, when finished in a conventional manner, and therefore vat dyes, sulfur dyes and naphthol dyes have been unavoidably used with various drawbacks as mentioned before. Thus, the present invention can be said to be markedly advantageous from industrial point of view.

The present invention is illustrated in more detail with reference to the following Examples, which are only illustrative and not intended to limit the scope of the present invention. In Examples, parts are by weight.

EXAMPLE 1

In water (200 parts) was dissolved a dye (0.3 part) of the following formula in the free acid form (1),

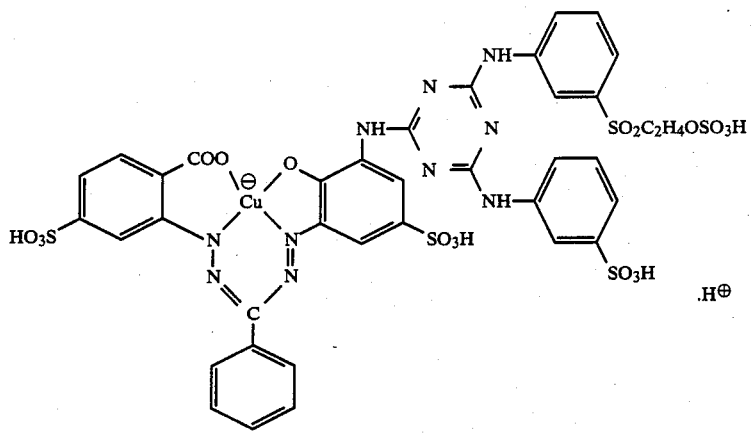

and anhydrous sodium sulfate (10 parts) was added thereto. Mercerized cotton broad cloth (10 parts) was dipped into the bath. The bath was heated to 60° C., and then sodium carbonate (4 parts) was added thereto. Dyeing was continued for 60 minutes at that temperature. Thereafter, the dyed cloth was washed with water and soaped to obtain a dyed product of a deep blue color.

The dyed product was subjected to fixing treatment at a temperature of 60° C. for 20 minutes in a solution containing a cationic polymer of quaternary ammonium salt (Danfix 505-RE, a product of Nittoh Boseki Co., in Japan, 0.4 part).

The treated product was washed with water and dried to obtain a finished product of a deep blue color superior in fastness properties such as light fastness, perspiration-light fastness, chlorine fastness, washing fastness and the like. The color shade of the product was kept unchanged as compared with that before the fixing treatment.

The dyed product obtained in the same manner as above was dipped into a bath (100 parts) containing a urea-melamine-formaldehyde precondensate (Sumitex Resin ULW, a product of Sumitomo Chemical Co., 20 parts) and an organic amine salt catalyst (Sumitex Accelerator ACX, a product of Sumitomo Chemical Co., 1 part), and then press-sueeezed to 60% in pick-up. The product thus treated was dried for 1 minute at 120° C. and then subjected to curing for 3 minutes at 150° C. to obtain a finished product of a deep blue color having superior anticrease and shrinkproofing properties. The product was found to be little in a color change and excellent in fastness properties such as light fastness, hot pressing fastness, steam set fastness, perspiration-light fastness and chlorine fastness.

REFERENCE EXAMPLE 1

(Synthesis of the dye (1) used in Example 1)

A mixture of 2-carboxyphenylhydrazine-5-sulfonic acid (23.2 parts) and benzaldehyde (11.0 parts) in water (100 parts) was stirred at 55° C. over night to obtain the corresponding hydrazone compound.

On the other hand, a solution of 3-acetylamino-2-hydroxyaniline-5-sulfonic acid (24.6 parts) and concentrated hydrochloric acid (28.2 parts) in water (50 parts) was cooled to 0° to 10° C., and a solution of sodium nitrite (7.1 parts) in water (13 parts) was added thereto. The mixture was stirred for 1 to 2 hours at that temperature, and thereafter the excess nitrous acid present therein was decomposed to obtain the corresponding diazonium salt.

A mixture of the resulting diazonium salt and the hydrazone compound obtained above was stirred at 0° to 5° C. with addition of sodium carbonate, until the idazonium salt disappeared. The resulting formazan was adjusted to pH 5 to 6 using acetic acid and mixed with crystal copper sulfate (26.2 parts). The mixture was stirred at 40° to 50° C. for about 5 hours, followed by salting-out with sodium chloride to obtain the corresponding copper complex. The copper complex was kept in a 3% aqueous sodium hydroxide solution at 90° C. for about 1 hour to hydrolyze the acetylamino group.

The resulting reaction mixture adjusted to pH 3 to 4 was mixed with cyanuric chloride (16.6 parts), and the mixture was stirred at 0° to 5° C. for 3 hours, during which the mixture was kept at pH 3 to 4 using a 20% aqueous sodium carbonate solution.

Successively, aniline-3-sulfonic acid (15.6 parts) was added thereto, and the mixture was heated to 40° C., while controlling the pH within 5 to 6 using a 20% aqueous sodium carbonate solution, and kept for 5 hours at that temperature. Thereafter, 1-aminobenzene-3-β-sulfatoethylsulfone (25.3 parts) was added thereto, and the mixture was stirred for 10 hours at 70° to 80° C. within a pH of 4 to 5. The reaction mixture was mixed with sodium chloride, and the resulting precipitate was collected on a suction filter, washed and then dried at 60° C. to obtain the desired dye of the formula (1).

COMPARATIVE EXAMPLE 1

Using a dye of the following formula in a free acid form (2),

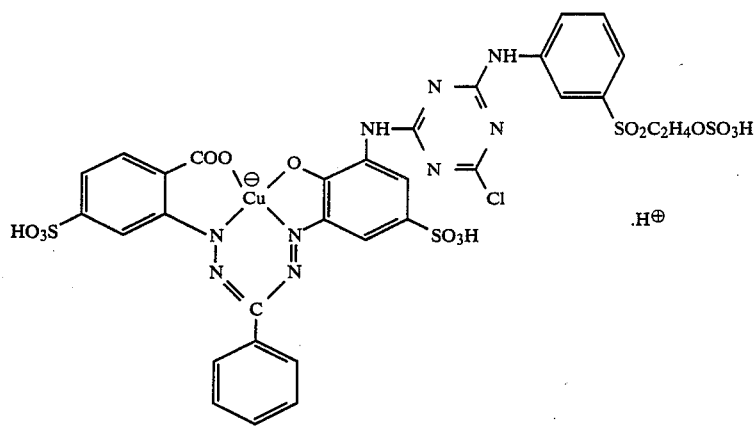

(2)

dyeing was carried out in the same manner as in Example 1 to obtain a dyed product of a deep blue color.

The dyed product was subjected to fixing treatment in the same manner as in Example 1, whereby the color shade markedly changed to reddish shade.

EXAMPLE 2

In water (150 parts) was dissolved a dye (0.3 part) of the following formula in a free acid form (3),

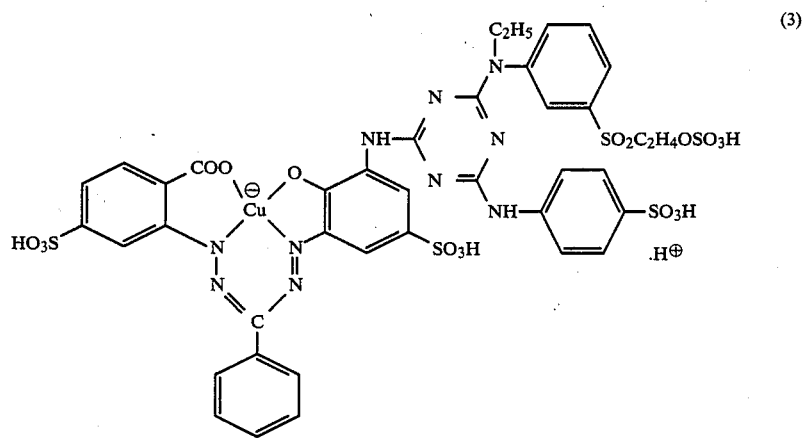

(3)

and anhydrous sodium sulfate (10 parts) was added thereto. Unmercerized cotton woven fabric (10 parts) was dipped into the bath. The bath was heated to 60° C., and then sodium carbonate (3 parts) was added thereto. Dyeing was continued for 60 minutes at that temperature. Thereafter, the dyed fabric was washed with water and soaped to obtain a dyed product of a deep blue color.

The dyed product was subjected to fixing treatment at a temperature of 60° C. for 20 minutes in a solution containing a water soluble cationic resin of polyamine (Sunfix 555, a product of Sanyo Kasei Co., in Japan, 1 part) in water (200 parts). The treated product was washed with water and dried to obtain a finished product of a deep blue color superior in fastness properties such as light fastness, perspiration-light fastness, chlorine fastness, washing fastness and the like. The color shade of the product was kept unchanged as compared with that before the fixing-treatment.

The dyed product obtained in the same manner as above was dipped in a bath (100 parts) containing methylated methyloluron (Sumitex Resin 800K, a product of Sumitomo Chemical Co., 10 parts) and an organic amine salt catalyst (Sumitex Accelerator ACX, a product of Sumitomo Chemical Co., 1 part), and then press-squeezed to 65% in pick-up. The product thus treated was dried at 120° C. for 1 minute and then cured at 160° C. for 2 minutes to obtain a finished product of a deep blue color superior in anticrease and shrinkproofing properties. The product was found to be little in a color change and superior in fastness properties such as light fastness, hot-pressing fastness, steam set fastness, perspiration-light fastness, chlorine fastness and the like.

COMPARATIVE EXAMPLE 2

Using a dye of the following formula in a free acid form (4),

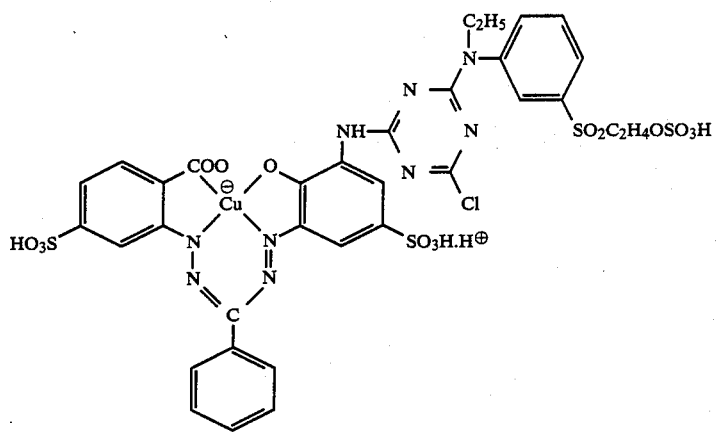

(4)

dyeing was carried out in a manner similar to that of Example 2, thereby obtaining a dyed product of a deep blue color.

The dyed product was subjected to fixing treatment in the same manner as in Example 2, whereby the color shade markedly changed to a reddish shade.

EXAMPLE 3

In water (200 parts) was dissolved a dye (0.6 part) of the following formula in the free acid form (5),

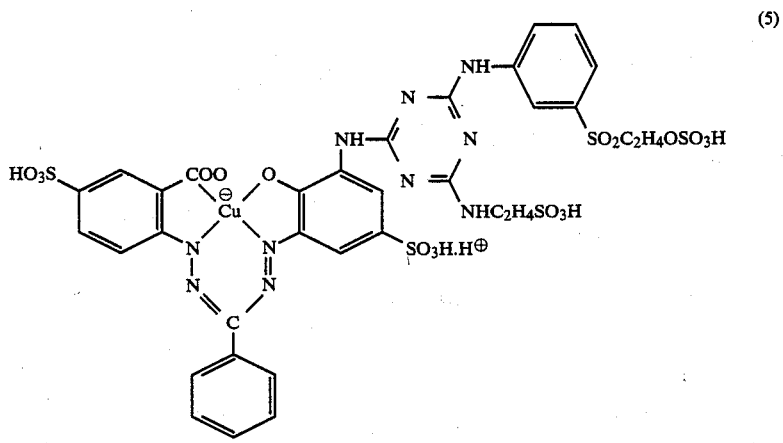

(5)

and anhydrous sodium sulfate (15 parts) was added thereto. Mercerized cotton woven fabric (10 parts) was dipped therein, and the bath was heated to 60° C. Then, sodium carbonate (4 parts) was added thereto, and dyeing was continued for 60 minutes at that temperature. Thereafter, the dyed fabric was washed with water and soaped to obtain a dyed product of a deep blue color.

The dyed product was dipped in a solution of a dicyandiamide compound (Suprafix WF, a product of Nippon Senka Co., 15 parts) in water (1000 parts), and press-squeezed to 60% in pick-up. The treated product was dried to obtain a fix-treated product of a deep blue color superior in fastness properties such as light fastness, perspiration-light fastness, chlorine fastness, washing fastness and the like. The color shade of the product was kept unchanged as compared with that before the fixing treatment.

The dyed product obtained in the same manner as above was subjected to finishing treatment in the same manner as the latter half of Example 1, thereby obtaining a finished product superior in anticrease and shrinkproofing properties. The product was found to be little in a color change and superior in fastness properties such as light fastness, hot pressing fastness, steam set fastness, perspiration-light fastness, chlorine fastness and the like.

COMPARATIVE EXAMPLE 3

Using a dye of the following formula in the free acid form (6),

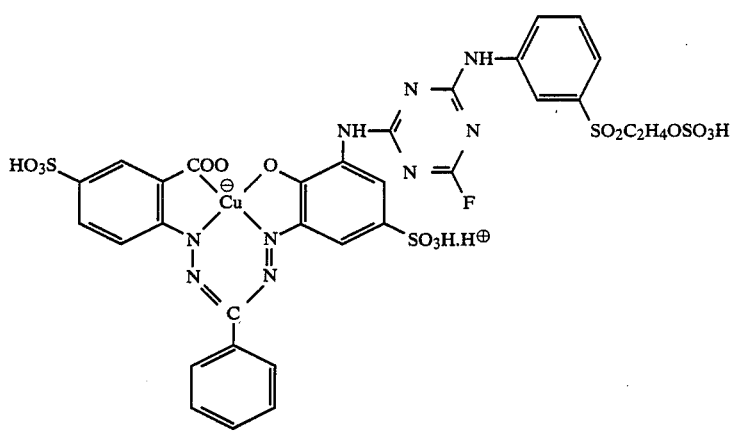

(6)

dyeing was carried out in a manner similar to that of Example 3 to obtain a dyed product of a deep blue color.

The dyed product was subjected to fixing treatment in the same manner as in Example 3, whereby the color shade markedly changed to a reddish shade.

EXAMPLE 4

Using the dyes (7) to (26) as shown in the following table, each dyeing was carried out in the same manner as in Example 1 to obtain each dyed product of a deep blue color.

The dyed product was subjected to fixing treatment in the same manner as in Example 1, whereby each finished product was obtained with unchanged color shade superior in fastness properties such as light fastness, perspiration-light fastness, chlorine fastness, washing fastness and the like.

The dyed product obtained above was dipped in a bath (100 parts) containing methylated methyloluron (Sumitex Resin 800K, a product of Sumitomo Chemical Co., 10 parts), and an organic amine salt catalyst (Sumitex Accelerator ACX, a product of Sumitomo Chemical Co., 1 part), press-squeezed up to 65% in pick-up, dried at 120° C. for 1 minute and cured at 160° C. for 2 minutes to obtain a finished product of a deep blue color superior in anticrease and shrinkproofing properties. The product was found to be little in the color change and superior in fastness properties such as light fastness, hot pressing fastness, steam set fastness, and the like.

The dyes used above were prepared in a manner similar to that of Reference Example 1, provided that the intermediate compound obtained in that Example, that is, copper complex of N-(2-carboxy-5-sulfophenyl)-N-(2'-hydroxy-3'-amino-5'-sulfophenyl)-ms-phenylformazan, aniline-3-sulfonic acid and 1-aminobenzene-3-β-sulfatoethylsulfone used in that Example were replaced by those shown in Columns I, II and III of the following table, respectively.

| Dye No. | Column I | Column II | Column III |
|---|---|---|---|
| 7 | Copper complex of N—(2-carboxy-5-sulfophenyl)-N—(2'-hydroxy-3'-amino-5'-sulfophenyl)-ms-phenylformazan | Aniline-2-sulfonic acid | 1-Aminobenzene-4-β-sulfatoethyl-sulfone |
| 8 | " | Taurine | 1-Aminobenzene-3-β-sulfatoethyl-sulfone |
| 9 | " | Aniline-3-sulfonic acid | 1-N-Ethylamino-benzene-4-β-sulfatoethylsulfone |
| 10 | " | N—Methyl-aniline | 1-Amino-2-methoxy-benzene-5-β-sulfatoethylsulfone |
| 11 | " | Diethanolamine | 2-Aminonaphthalene-6-β-sulfatoethyl-sulfone |
| 12 | " | N—Methyltaurine | 1-Aminobenzene-3-β-sulfatoethyl-sulfone |
| 13 | Copper complex of N—(2-carboxy-5-sulfophenyl)-N—(2'-hydroxy-3'-amino-5'-sulfophenyl)-ms-phenylformazan | Aniline | 2-Aminonaphthalene-8-β-sulfatoethyl-sulfone-6-sulfonic acid |
| 14 | " | Methanol | 1-Aminobenzene-4-β-sulfatoethyl-sulfone |
| 15 | " | β-Methoxyethanol | " |
| 16 | " | 4-N—Methylamino-benzenesulfonic | 1-Aminobenzene-3-β-sulfatoethyl- |

-continued

| Dye No. | Column I | Column II | Column III |
|---|---|---|---|
| 17 | " | 6-Naphthylamine-2-sulfonic acid | sulfone<br>" |
| 18 | " | Ammonia | " |
| 19 | Copper complex of N—(2-carboxy-4-sulfophenyl)-N—(2'-hydroxy-3'-amino-5'-sulfophenyl)-ms-phenylformazan | Aniline-4-sulfonic acid | " |
| 20 | Copper complex of N—(2-carboxy-4-sulfophenyl)-N—(2'-hydroxy-3'-amino-5'-sulfophenyl)-ms-phenylformazan | Aniline-2-sulfonic acid | 1-N—Ethylbenzene-4-β-sulfatoethylsulfone |
| 21 | Copper complex of N—(2-carboxy-5-sulfophenyl)-N—(2'-hydroxy-3'-amino-5'-sulfophenyl)-ms-2"-sulfophenylformazan | Aniline | 1-Aminobenzene-4-vinylsulfone |
| 22 | Copper complex of N—(2-carboxy-4-sulfophenyl)-N—(2'-hydroxy-3'-amino-5'-sulfophenyl)-ms-2"-sulfophenylformazan | N—Methylaniline | 1-Amino-4-methoxybenzene-3-β-sulfatoethylsulfone |
| 23 | Copper complex of N—(2-carboxy-5-sulfophenyl)-N—(2'-hydroxy-3'-amino-5'-sulfophenyl)-ms-4"-methoxyphenylformazan | Aniline-3-sulfonic acid | 1-Aminobenzene-3-β-sulfatoethylsulfone |
| 24 | Copper complex of N—(2-carboxy-5-sulfophenyl)-N—(2'-hydroxy-3'-amino-5'-sulfophenyl)-ms-3"-nitrophenylformazan | " | " |
| 25 | Copper complex of N—(2-carboxy-4-sulfophenyl)-N—(2'-hydroxy-3'-amino-5'-sulfophenyl)-ms-4"-chlorophenylformazan | Aniline-3-sulfonic acid | 1-Aminobenzene-3-β-sulfatoethylsulfone |
| 26 | Copper complex of N—(2-carboxy-5-sulfophenyl)-N—(2'-hydroxy-3'-amino-5'-sulfophenyl)-ms-4"-methylphenylformazan | " | " |

EXAMPLE 5

In water (200 parts) was dissolved a dye (0.3 part) of the following formula in the free acid form (27),

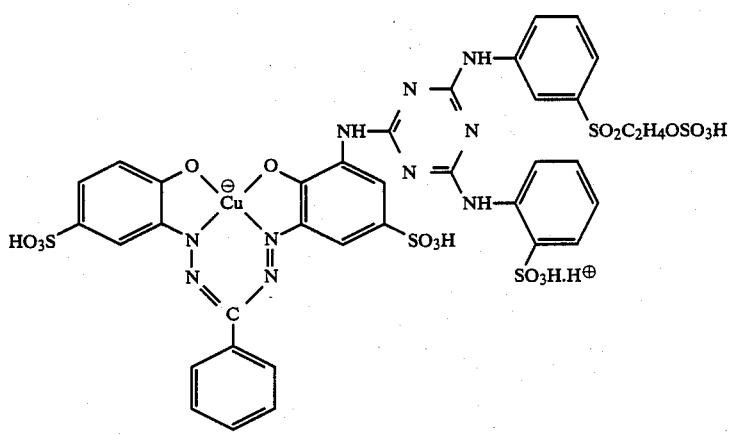

(27)

and anhydrous sodium sulfate (10 parts) was added thereto. Unmercerized cotton woven fabric (10 parts) was dipped therein and the bath was heated to 60° C. Then, sodium carbonate (4 parts) was added thereto, and dyeing was continued for 60 minutes at that temperature. Thereafter, the dyed fabric was washed with water and soaped to obtain a dyed product of a deep blue color.

The dyed product was subjected to fixing treatment at 60° C. for 20 minutes in a solution prepared by dissolving a quaternary ammonium salt of a specific polymer (Neofix R-250, a product of Nikka Kagaku Co., in Japan, 0.5 part) in water (200 parts). The treated fabric was washed with water and dried to obtain a fixed product of a deep blue color superior in fastness properties such as light fastness, perspiration-light fastness, chlorine fastness, washing fastness and the like without any color change.

The dyed product obtained in the same manner as above was dipped in a bath (100 parts) containing methylated trimethylolmelamine (Sumitex Resin MK, a product of Sumitomo Chemical Co., 7 parts) and an organic amine salt catalyst (Sumitex Accelerator, a product of Sumitomo Chemical Co., 0.7 part), press-squeezed to 60% in pick-up, dried at 120° C. for 1 minute and then cured at 160° C. for 2 minutes to obtain a finished product of a deep blue color superior in anti-crease and shrinkproofing properties. The finished product was found to be little in a color change and superior in fastness properties such as light fastness, hot pressing fastness, steam set fastness, perspiration-light fastness, chlorine fastness and the like.

REFERENCE EXAMPLE 2

(Synthesis of the dye (27) used in Example 5)

A diazonium salt prepared by diazotizing sodium salt of 3-acetylamino-2-hydroxyaniline-5-sulfonic acid (24.6 parts) in a conventional manner was added at pH 12 to 13 to an aqueous solution of a hydrazone compound (30.6 parts) prepared from 2-methoxy-5-sulfophenylhydrazone and benzaldehyde, and the mixture was kept at a pH of 12 to 13 using sodium hydroxide. The hydroxymethoxy-formazan-containing reaction mixture was mixed with a solution of crystal copper sulfate (25 parts), potassium sodium tartarate tetrahydrate (33.5 parts) and 40% sodium hydroxide (63 parts) in water (250 parts), and the mixture was refluxed at 100° C. for 5 hours to perform the demethylation, complex formation and hydrolysis of the acetylamino group.

The reaction mixture was mixed with sodium chloride and potassium chloride in each amount of 10% by volume, cooled and adjusted to pH 0.5 by adding concentrated hydrochloric acid, thereby precipitating the aminoformazan compound, which was then separated by filtration.

The precipitate obtained was suspended in water, and the suspension was cooled to 0° C. and adjusted to pH 7 using sodium hydroxide and then mixed with cyanuric chloride. The mixture was kept at pH 5 to 6 using an aqueous 20% sodium carbonate solution, and then mixed with aniline-2-sulfonic acid (17.3 parts). The mixture was heated to 50° C. while controlling the pH within 5 to 6 using an aqueous 20% sodium carbonate solution, and then stirred for 6 hours. Thereafter, 1-aminobenzene-3-β-sulfatoethylsuflone (28.3 parts) was added thereto, and the mixture was stirred at 70° to 80° C. for 10 hours within a pH of 4 to 5. The reaction mixture was mixed with sodium chloride, and the precipitate collected on a suction filter was washed and dried at 60° C. to obtain the desired dye (27).

COMPARATIVE EXAMPLE 4

Using a dye of the following formula in the free acid form (28),

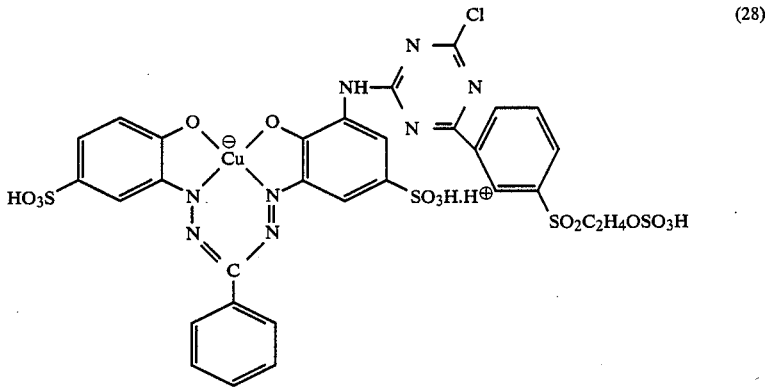

dyeing was carried out in the same manner as in Example 5 to obtain a dyed product of a deep blue color.

The dyed product was subjected to fixing treatment in the same manner as in Example 5, whereby the color shade of the dyed product makedly changed to a reddish shade.

EXAMPLE 6

Reference Example 2 was repeated, provided that the intermediate formazan compound was replaced by those shown in Column I of the following table which were prepared in a manner similar to that of Reference Example 2, and aniline-2-sulfonic acid and 1-aminobenzene-3-β-sulfatoethylsulfone were replaced by those shown in Columns II and III of the following table, respectively, thereby obtaining the corresponding dyes (29) to (40).

Each dye (65 parts) was dissolved in hot water. To this solution were added an aqueous 32.5% sodium hydroxide solution (15 parts) and 50° Be' water glass (150 parts), and further water was added thereto to make the whole 1000 parts.

Using the dye solution as a padding liquor, mercerized cotton woven fabric was subjected to padding. The fabric padded was batched up, wrapped tightly with a polyethylene film, allowed to stand in a room kept at 20° C. for 20 hours, thereafter washed with water and soaped to obtain each dyed product of a deep blue color.

The dyed product was dipped in a solution of quaternary ammonium salt of cationic polymer (Danfix 1000, a product of Nittoh Boseki Co., in Japan, 20 parts) in water (1000 parts), press-squeezed to 60% in pick-up and dried to perform a fixing treatment.

The finished product was found to have an unchanged color shade and superior in fastness properties such as light pastness, perspiration-light fastness, chlorine fastness, washing fastness and the like.

The dyed product obtained in the same manner as above was dipped in a bath (1000 parts) containing dimethylol dihydroxyethyleneurea (Sumitex Resin NS-11, a product of Sumitomo Chemical Co., 100 parts) and an inorganic metal salt catalyst (Sumitex Accelerator KX, a product of Sumitomo Chemical Co., 20 parts), and then press-squeezed to 60% in pick-up. The product thus treated was dried for 1 minute at 120° C. and cured for 3 minutes at 150° C. to obtain a finished product of a deep blue color having excellent anticrease, shrinkproofing and permanent press properties. The product was found to be little in a color change and excellent in various fastness properties such as light fastness, hot pressing fastness, steam set fastness and chlorine fastness.

Chemical Co., 10 parts) and a specific metal salt catalyst (Sumitex Accelerator X-80, a product of Sumitomo Chemical Co., 2 parts), press-squeezed to 60% in pick-up, dried at 120° C. for 1 minute and cured at 150° C. for 3 minutes, thereby obtaining a finished product of a deep blue color superior in anticrease and shrinkproofing properties. The finished product was found to be little in the color change and superior in fastness properties such as light fastness, hot pressing fastness, steam set fastness, chlorine fastness and the like.

EXAMPLE 8

Each dyed product obtained in Examples 1 and 2 was dipped in a bath (1000 parts) containing a cationic polymer of quaternary ammonium salt (Danfix 505-RE, a product of Nittoh Boseki Co., 20 parts), methylated methyloluron (Sumitex Resin 800K, a product of Sumitomo Chemical Co., 100 parts) and an organic amine salt catalyst (Sumitex Accelerator ACX, a prod-

| Dye No. | Column I | Column II | Column III |
|---|---|---|---|
| 29 | Copper complex of N—(2-hydroxy-4-sulfophenyl)-N—(2'-hydroxy-3'-amino-5'-sulfophenyl)-ms-phenylformazan | Aniline-3-sulfonic acid | 1-Aminobenzene-4-β-sulfatoethylsulfone |
| 30 | " | N—Methylaniline | 1-Aminobenzene-3-β-sulfatoethylsulfone |
| 31 | " | Aniline-4-sulfonic acid | 1-N—Ethylaminobenzene-4-β-sulfatoethylsulfone |
| 32 | " | Taurine | 1-Amino-2-methoxybenzene-5-β-sulfatoethylsulfone |
| 33 | Copper complex of N—(2-hydroxy-5-sulfophenyl)-N—(2'-hydroxy-3'-amino-5'-sulfophenyl)-ms-phenylformazan | N—Methyltaurine | 2-Aminonaphthalene-6-β-sulfatoethylsulfone |
| 34 | Copper complex of N—(2-hydroxy-5-sulfophenyl)-N—(2'-hydroxy-3'-amino-5'-sulfophenyl)-ms-2"-sulfophenylformazan | Aniline-3-sulfonic acid | 1-Aminobenzene-3-β-sulfatoethyl sulfone |
| 35 | Copper complex of N—(2-hydroxy-4-sulfophenyl)-N—(2'-hydroxy-3'-amino-5'-sulfophenyl)-ms-4"-methoxyphenylformazan | Aniline-3-sulfonic acid | 1-N—Carbamoylethyl-aminobenzene-3-β-sulfatoethylsulfone |
| 36 | Copper complex of N—(2-hydroxy-4-sulfophenyl)-N—(2'-hydroxy-3'-amino-5'-sulfophenyl)-ms-3"-nitrophenylformazan | Dimethylamine | 1-Aminobenzene-4-β-sulfatoethylsulfone |
| 37 | Copper complex of N—(2-hydroxy-5-sulfophenyl)-N—(2'-hydroxy-3'-amino-5'-sulfophenyl)-ms-4"-chlorophenylformazan | Ammonia | " |
| 38 | Copper complex of N—(2-hydroxy-5-sulfophenyl)-N—(2'-hydroxy-3'-amino-5'-sulfophenyl)-ms-4"-methylphenylformazan | N—Ethylaniline-3-sulfonic acid | 1-Aminobenzene-3-β-sulfatoethyl sulfone |
| 39 | Copper complex of N—(2-hydroxy-5-sulfophenyl)-N—(2'-hydroxy-3'-amino-5'-sulfophenyl)-ms-phenyl-formazan | Methanol | " |
| 40 | " | β-Methoxyethanol | " |

EXAMPLE 7

Each dyed product obtained in Examples 1 and 2 was dipped in a bath (100 parts) containing dimethylolethyleneurea (Sumitex Resin 901, a product of Sumitomo Chemical Co., 10 parts), and then press-squeezed to 60% in pick-up. Each product thus treated was dried at 120° C. for 1 minute and then cured at 160° C. for 2 minutes. The product obtained was found to be little in a color change and superior in fastness properties such as light fastness, perspiration-light fastness, chlorine fastness, washing fastness, hot-pressing fastness and steam set fastness.

What is claimed is:

1. A method for producing dyed and finished products of cellulose fiber materials, which comprises dyeing cellulose fiber materials with a dye represented by the following formula (I) in the free acid form,

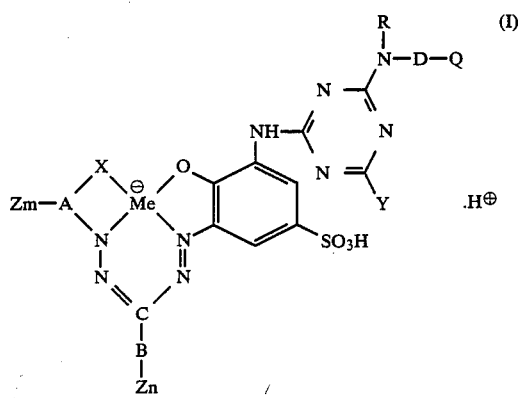

wherein A is a substituted or unsubstituted phenylene or naphthylene group, B is a straight or branched alkyl or alkenyl group or a phenyl, naphthyl or heterocyclic group, the alkyl, alkenyl, phenyl, naphthyl and heterocyclic groups being substituted or unsubstituted, Me is an ion of a metal having an atomic number of from 27 to 29, X is —O— or

Y is a substituted or unsubstituted lower alkoxy or phenoxy group or —NR$_1$R$_2$ in which R$_1$ and R$_2$ independently of one another are each a hydrogen atom or a substituted or unsubstituted lower alkyl, phenyl, naphthyl or benzyl group, Z is a water-solubility-imparting group, m and n are each 0 or an integer of 1 to 3, provided that the sum of m and n is 1 to 3, D is a substituted or unsubstituted phenylene or naphthylene group, Q is —SO$_2$CH=CH$_2$ or —SO$_2$CH$_2$CH$_2$L in which L is a group splittable by the action of an alkali, and R is a hydrogen atom or a substituted or unsubstituted lower alkyl group, and then finishing the dyed fiber materials with a fixing agent or/and a finishing agent capable of bonding with cellulose through a bridge formation.

2. A method according to claim 1, wherein the dye has a sulfo group as Z, a copper ion as Me, a substituted or unsubstituted phenyl group as B,

as X and a substituted or unsubstituted phenylene group as A in the formula (I).

3. A method according to claim 2, wherein the dye has —NR$_3$R$_4$ as Y, in which R$_3$ is a hydrogen atom, a methyl group or a lower alkyl group unsubstituted or substituted by hydroxy, sulfo or carboxy, R$_4$ is a hydrogen atom, a methyl group, a lower alkyl group unsubstituted or substituted by hydroxy, sulfo or carboxy, or a phenyl or naphthyl group unsubstituted or substituted by carboxy or sulfo.

4. A method according to claim 1, wherein the dye is represented by the following formula (II) in the free acid form,

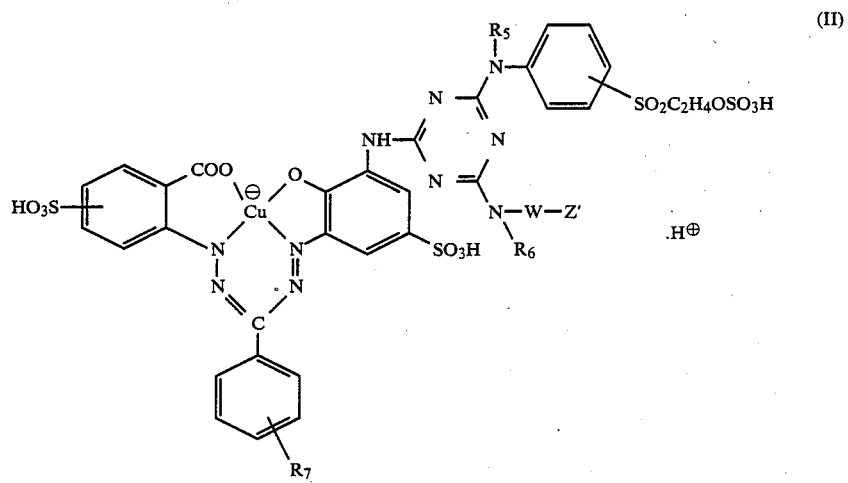

wherein R$_5$ and R$_6$ independently of one another are each hydrogen, methyl or ethyl, R$_7$ is hydrogen, methyl, ethyl, nitro, sulfo or chlorine, W is a lower alkylene or phenylene group, and Z' is hydrogen, sulfo or carboxy.

5. A method according to claim 1, wherein the dye is represented by the following formula (III) in the free acid form,

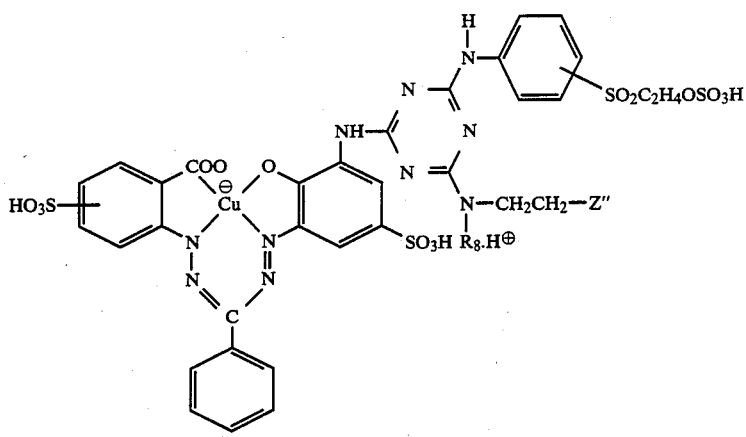

(II')

wherein $R_8$ is hydrogen, methyl or ethyl, and $Z''$ is sulfo or carboxy.

6. A method according to claim 1, wherein the fixing agent is at least one member selected from polyamine compounds, dicyandiamide compounds and quaternary ammonium salts.

7. A method according to claim 1, wherein the finishing agent is at least one member selected from N-methylol compounds, aldehyde compounds of the following formula,

R—CHO wherein

R is a hydrogen atom or an alkyl, cycloalkyl or haloalkyl group, acetal compounds of the following formula,

R'—CH(OR")$_2$ wherein

R' is a hydrogen atom or an alkyl, cycloalkyl or haloalkyl group, and R" is a hydrogen atom or an alkyl group, epoxy compounds, active vinyl compounds, aziridinyl compounds, polycarboxylic acid compounds, acylhalide compounds, isocyanate compounds and quaternary ammonium compounds.

8. Cellulose fiber materials dyed and finished by the method of claim 1.

* * * * *